Jan. 16, 1962

J. D. CUMMINGS 3,016,856

PIPE ALIGNMENT CLAMP

Filed Dec. 29, 1958

3 Sheets-Sheet 1

J. D. Cummings
INVENTOR.

BY G.C. Helmig

ATTORNEY

Jan. 16, 1962   J. D. CUMMINGS   3,016,856
PIPE ALIGNMENT CLAMP
Filed Dec. 29, 1958   3 Sheets-Sheet 2

J. D. Cummings
INVENTOR.

BY  Ig C Helmig

ATTORNEY

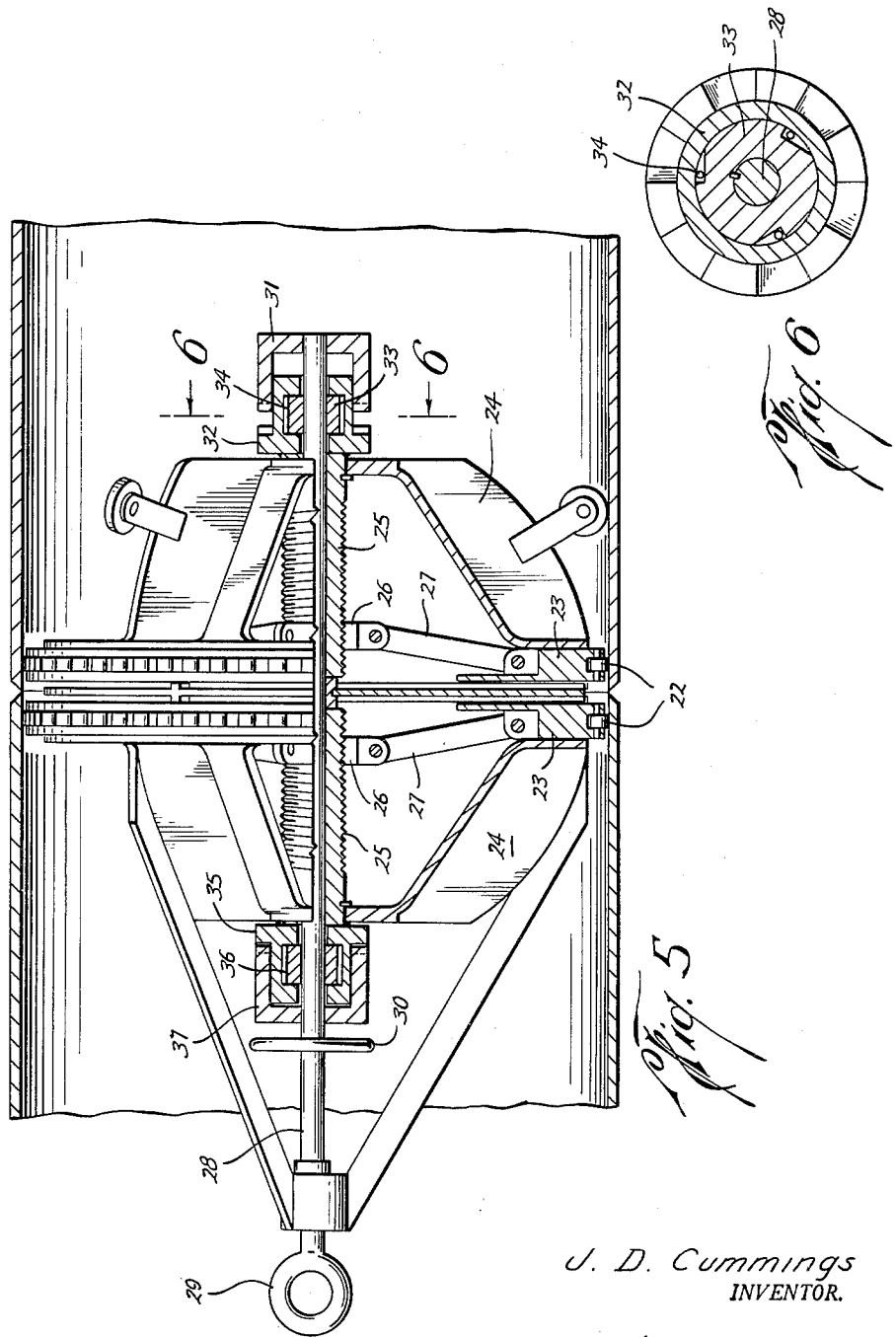

3,016,856
PIPE ALIGNMENT CLAMP
James D. Cummings, San Marcos, Tex., assignor to Crutcher-Rolfs-Cummings, Inc., Houston, Tex., a corporation of Texas
Filed Dec. 29, 1958, Ser. No. 783,238
6 Claims. (Cl. 113—102)

This invention relates to internal line-up clamps for expansible bearing engagement with the interior surfaces at adjacent ends of a pair of pipe line sections and to co-operate in the application of deforming pressure when necessary to bring adjoining pipe wall edges into aligned abutment and thereafter maintain the relation preparatory to and during their weldment one to the other.

It is an object of the invention to provide expander shoe segments with peripherally arranged small rollers closely spaced together and individually rotatable each on an axis parallel to the longitudinal pipe axis and positioned so that the outer tread faces lie on a circle corresponding to the interior pipe wall surface and engageable with the same on narrow longitudinal lines for clamp force concentration at circularly spaced intervals on the pipe wall and which rotatable rollers by reason of their rotational freedom minimize frictional drag upon relative clamp adjustment and also present different bearing areas to the pipe walls at successive uses for distribution of wear thereon and for prolonged life.

Another object of the invention is to provide an improved clamp assembly and controlled expander mechanism for two sets of circular segments whereby one set can be expanded into clamp relation with one pipe section and thereafter and upon alignment with the pipe end of a second pipe section, the other set of segments can be expanded into clamping relation and then still later, after the pipe section edges are united, both sets of circular segments can be retracted quickly under force supplied to both at the same time.

Figure 1:
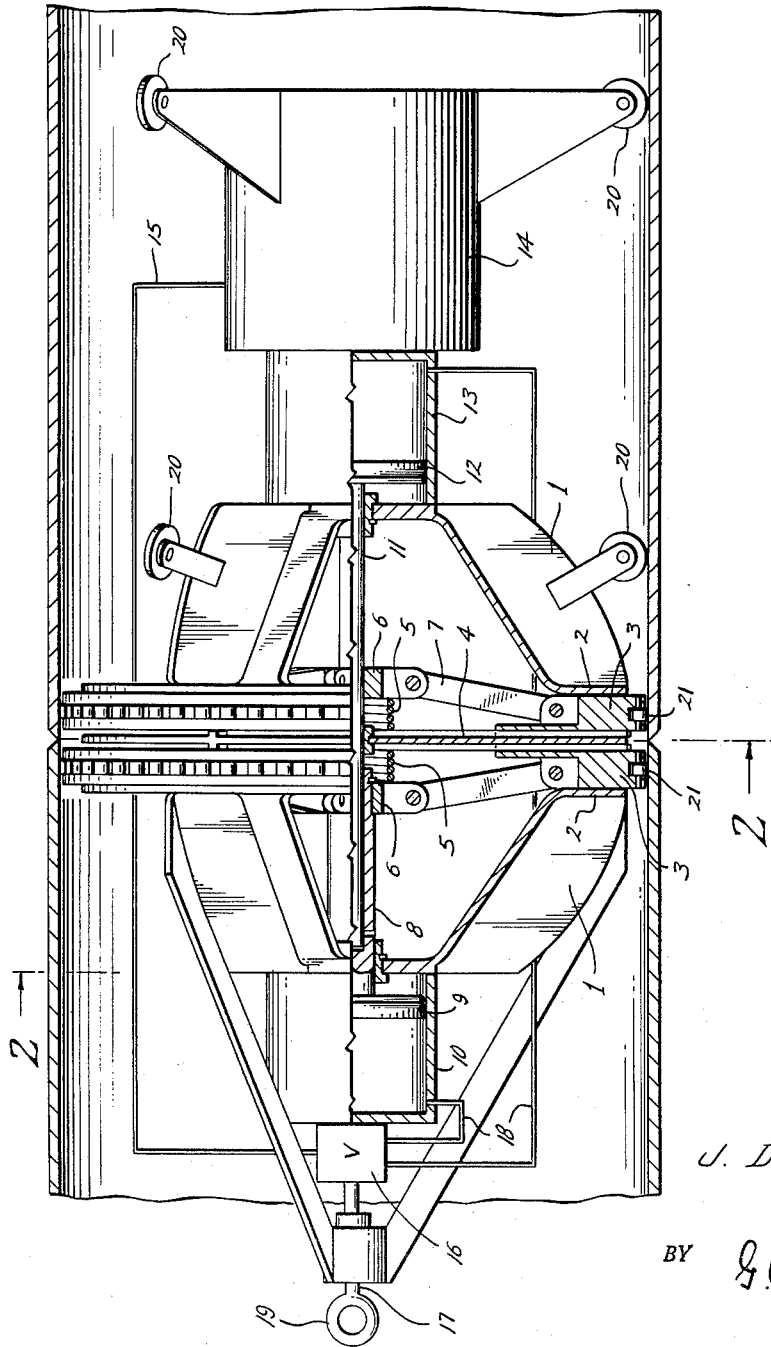
Figure 2:
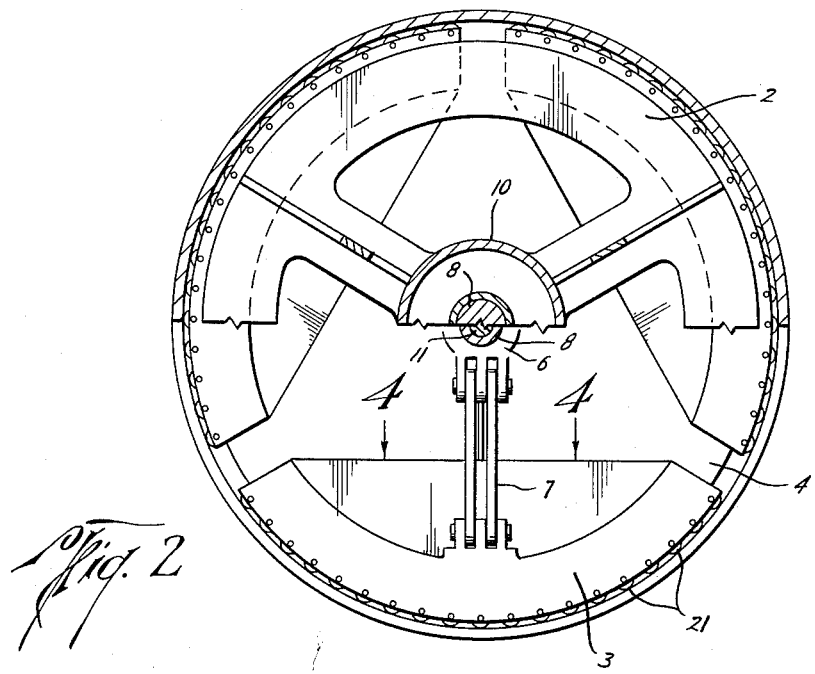
Figure 3:
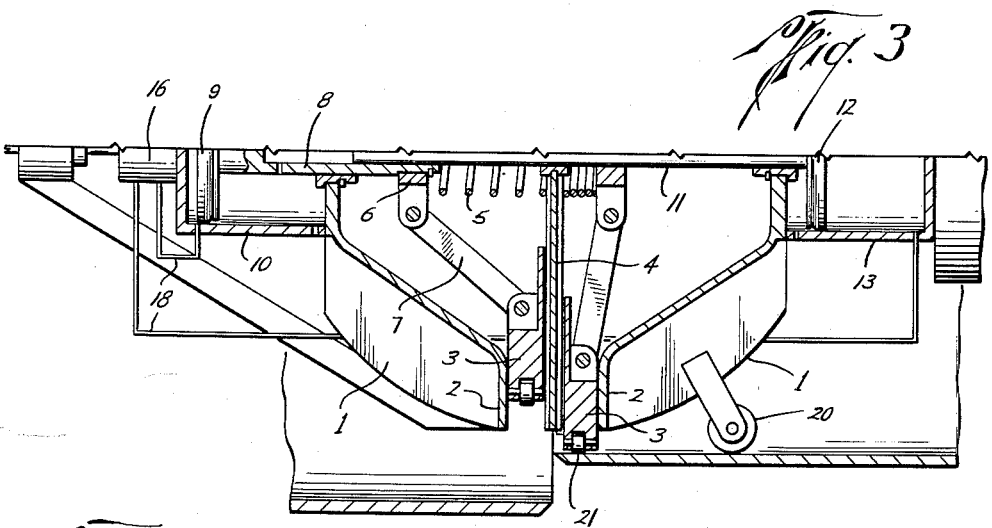
Figure 4:
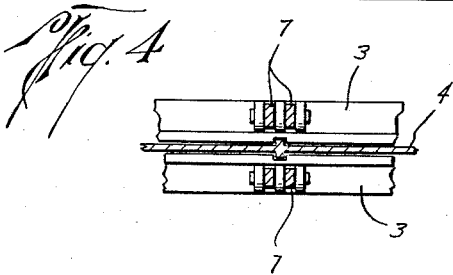

In the accompanying drawing, FIG. 1 is a side elevation with parts in longitudinal vertical section of a clamp assembly embodying the invention; FIG. 2 is a transverse section taken substantially on line 2—2 of FIG. 1; FIG. 3 is a fragmentary view in longitudinal section and shows the parts of FIG. 1 in clamped relation to one pipe section and just before the other pipe section is brought into alignment; FIG. 4 is a detail section on line 4—4 of FIG. 2; and FIG. 5 is partly a side elevation and partly a longitudinal section of an alignment clamp assembly arranged for manual actuation; and FIG. 6 is a detail transverse section as on line 6—6 of FIG. 5.

The clamp assembly shown in the drawings has been designed for ruggedness and ease of handling and in part this is accomplished by structural shapes of light weight metals, inclusive of aluminum, in making up the main frame of the clamp. The main frame consists essentially of a pair of similar cast aluminum bowls 1—1 arranged in opposing relation to afford a hollow enclosure to house the operating parts in a manner to be substantially free of the working stresses. Each bowl has a conical wall with integral stiffening webs and the small end centrally mounts a shaft bearing bushing. Companion bowls are anchored to one another in longitudinal alignment and spacing by a series of internal tie rods or the like and with adjacent large diameter end portions formed as co-operating radial flanges 2—2 spaced apart for guidably receiving therebetween two sets of radially movable circular segments 3, with the sets arranged in side by side order. In the embodiment illustrated, each set consists of three segments. Separating the two sets of segments 3 and providing radial guide bearings therefor in co-operation with the flanges 2 is a central division plate 4. Adjacent bearing faces of the segment 3 and plate 4, preferably and as seen in FIG. 4, are provided with interlocking and radially projecting tongue and groove formations for keying the parts against relative rotary displacement but accommodating radial guided segment movement.

Centrally of this plate 4 and bearing on opposite faces thereof are a pair of coil springs 5 which tend to spread apart a pair of hubs or spiders 6. Relative axial travel of the spiders 6 is transmitted to the circular segments 3 by means of shackle or expander links 7 which extend generally in radial directions and are pivoted at opposite ends to the spiders 6 and segments 3. The left-hand spider 6, as seen in the drawing, is fixed to a tubular rod 8 which has slide bearing in the end wall of the adjacent housing bowl 1 and terminates in a movable piston 9 within a pressure fluid cylinder 10. Application of pressure fluid to the cylinder 10 pushes the piston against the elastic force of the coil spring 5 for radially expanding the set of segments linked to the left-hand spider 6. The right-hand spider 6 is fast to a rod 11 having telescopic bearing at one end within the hollow rod 8 and slide bearing through the end wall of the other housing bowl 1. The far end of the rod 11 is connected to a slide piston 12 contained within the fluid pressure motor cylinder 13 and acts in response to pressure fluid against its coil spring 5 in controlling the radial expansion and contraction of the segments 3 on the right-hand side of the bearing wall 4.

Rearwardly beyond the piston cylinder 13, and rigid therewith is an air storage tank 14 which is periodically charged with a supply of pressure air through a suitable inflation valve. A conduit 15 leads from the storage chamber 14 to a valve 16 at the front end of the frame and the valve is manipulated in response to a rotatable shaft 17 for controlling conduits 18 leading to the front and rear piston cylinders 10 and 13 for either supplying pressure air to one or the other of the cylinders or for venting both thereof. The forward end of the shaft 17 terminates in an eye or hook 19 for hand operation of the valve 16 by directly gripping the same or by fastening thereto a long crank handle projected for a distance to extend beyond the far end of a pipe section in which the clamp is received.

For travel of the assembly within a pipe and the support thereof when the clamps are contracted, a series of load supporting wheels 20 are journaled in mounting brackets carried by the assembly in positions to ride on the pipe interior surface.

The peripheral portion or rim of each circular segment 3 contains a circularly extending groove to receive a large number of circularly spaced apart small diameter rollers 21 whose outer tread portions project outwardly beyond the rim of each segment and are for engagement with the interior surface of pipe sections when the segments 3 are expanded. For pipe of thirty inches or thereabout, the use of one-inch rollers on centers spaced one and one-half inches will be suitable. Each roller 21 is mounted to rotate on a shaft or pin which extends through the roller and both side walls of the peripherally grooved segment in the longitudinal direction of the pipe to provide roller axes that extend parallel to one another and to the longitudinal center line of the clamp assembly. These rollers, being individually rotatable about the longitudinal axes, can present different peripheral portions thereof to bear on the inside surface of the pipe when their carrying segments are expanded and by their rotation on the pipe enable a rotational adjustment of the frame with a minimum of drag resistance. Since each makes line contact on a longitudinally extending line area, there will be a concentration of force therethrough for more readily stretching or bending the edge portion of a pipe which may have become dented or slightly out of round. Thus the two adjoining edges of pipe to be abutted and welded together can be brought into substantial alignment with one another in the normal use of the clamp for axially aligning adjoining pipe sections.

In the use of the clamp assembly, it is first positioned within a pipe section or brought forward from a previous weld to the open end of the pipe, whereupon the valve 16 is operated to supply air to the power cylinder 13 for expanding the interconnected rearmost set of circular segments until the rollers 21 are tightly seated against the inside of the wall of the pipe immediately adjacent the edge which is to be welded to another pipe section. Then the next successive pipe section is shifted into close abutment with the first pipe section and into near coaxial alignment, somewhat as shown in FIG. 3. Under control of the valve 16, pressure air is now directed to the forward power cylinder 10, and the resultant expansion of the interconnected forward set of circular segments 3 will cause a lateral shift of the forward pipe section into coaxial relation with the adjoining pipe section and bring the abutting wall edges into substantial alignment. The line concentration of internal pressure applied on the walls accompanied by rolling action thereon if necessary and with or without additional hammer blows on the exterior of the pipe, will correct wall deformities for insuring proper welding alignment of the adjoining pipe wall ends.

Upon completion of the welding operation, the valve 16 is again manipulated for shutting off pressure fluid to and for venting both piston motor cylinders and the force stored within the coil springs 5 will spread the spiders and retract the clamping segments. The assembly now rests on the pipe through the load transferring rollers 20 and the clamp assembly can be pulled forward to the next joint.

FIG. 5 illustrates a manually operated clamp assembly wherein the pipe engaging members comprise rollers 22 carried by expansible circular segments 23. As in the case of the pipe engaging rollers previously referred to, the rollers 22 are free to rotate about longitudinally extending axes and their treads provide a narrow line contact with the pipe in the direction of pipe length. A supporting frame or housing includes oppositely facing bowls 24 which at their adjoining radial flange portions guide the direction of movement of the expansible segments. Centrally mounted within the frame are a pair of axially extending hollow shafts 25 which are exteriorly screw threaded and are engaged by traveling nut spiders 26 joined by shackle links 27 with the respective sets of expansible circular segments. One of the shafts carries right-hand threads and the other carries left-hand threads so that the traveling nuts will move toward one another upon unisonal rotation of the shafts 25 in one direction while reverse rotation drives the traveling nuts apart. Extending slidably and rotatably through both of the hollow shafts 25 is a rod 28 which terminates forwardly in an operating eye 29 for manipulation by hand, either directly or through a long crank detachably engaged with the eye 29. Supplementing the eye 29 for hand actuation, there may be provided a hand wheel 30 fixed on the rod 28. The rearward end of the rod beyond the housing assembly has fixed thereto a cup shaped clutch member 31 formed with spaced jaw clutching teeth in its forward edge. Mating jaw teeth extend rearwardly from a clutching member 32 which is welded on or formed integrally with the rearward screw threaded shaft 25. The mating clutching jaws are engaged and disengaged when the control rod 28 is slid forwardly and rearwardly and when the clutch is active, rotation of the shaft 28 will impart rotation to the threaded screw shaft. The clutching member 32 additionally has a rearwardly extending hollow chamber in which is located a hub member 33 keyed on the control rod 28 and having peripheral camming notches therein, as seen in FIG. 6, and in which are located one-way clutching rollers 34 of a conventional type. Rotation of the hub 33 in a clockwise direction, as viewed in FIG. 6, allows the rollers 34 to move into the wide spaces of the cam slots without transmission of rotation. On the other hand, counterclockwise rotation of the hub 33 will cause the clutch rollers 34 to be wedged outwardly against the clutching member 32 and transmit the rotation to the rearward threaded shaft 25. A similar clutching mechanism is associated with the forward threaded shaft 25. Thus the front end of this threaded shaft carries a clutching member 35 which has one-way clutch relation with a clutch hub 36 fixed on the control rod 28 and has sliding jaw clutch connection with a clutch member 37, also fixed on the control rod 28. In FIG. 5 the jaw clutch engagement is effective between the clutch members 35 and 37 for transmitting rotation of the control rod 28 for expanding the rearward set of circular segments 23 in the operation of aligning abutting pipe ends in preparation for a welding operation. Upon completion of the welding operation, rotation of the control rod 28 in reverse direction will be transmitted to both shafts 25 for contracting the clamping elements and the transmission of such rotation will be through the one-way clutch connections between the hub 33 and the clutch 32 and between the hub 36 and the clutch 35. One of these one-way clutches need not be depended on for such transmission if its neighboring jaw clutch is in engagement, as is the case in the position of the parts shown in FIG. 5. When the clamp assembly has been moved to a new position at the free end of a pipe section and it is desired to expand the rearward set of circular segments 23, the control rod 28 is slid forwardly for coupling the clutches 31 and 32 and the control rod is then rotated for moving the rearward traveling nut forwardly. When the next adjoining pipe section is to be brought into edge to edge alignment, the control rod 28 is slid rearwardly for the positive clutching of the drive transmitting members 35 and 37 and the declutching of the members 31 and 32, whereupon the rotation of the control member 28 will carry with it the forward screw 25 for rearward movement of the nut 26 and expansion of the clamping elements.

In both forms of the clamp illustrated, the clamping contact with the inside of the pipe portions adjacent their edges is on narrow longitudinally extending and closely spaced together lines. Rolling contact enables ready adjustment and distributes wear over the tread of the rollers throughout their life and the tread line bearing importantly effects a concentration of expansion forces for more readily correcting deformities. Furthermore, the roller contact enables the clamping assembly to be rotated slowly with the application of outward force and the rolling action on the pipe interior irons out irregularities in curvature and better insures true circularity in each wall for easily obtaining better wall alignment at the abutting edges.

What is claimed is:

1. In an internal pipe line-up clamp, a rigid main frame having radially disposed guide bearings, two sets of circular segments radially movably guided in said bearings, expander means carried by the frame and operatively connected with said segments to control radial movement thereof, a circular succession of closely spaced apart shafts mounted on each segment near and against radial displacement relative to its periphery and on axes parallel to the longitudinal center line of said radially movable segments and rotatable rollers pivotally carried on said shafts and projected peripherally beyond the segments for transmitting the full force of segment expansion by rolling line contact bearing by each roller with the pipe wall interior surface.

2. In an internal pipe line-up clamp assembly, two sets of expansible circular segments for co-operation with adjacent ends of two pipes to be aligned, a succession of circularly spaced apart rollers mounted on said segments for rotation on axes radially fixed relative to the periphery of the circular segments and parallel to the longitudinal axis of the clamp assembly, said rollers having their outermost tread portions radially spaced outwardly from the peripheries of said segments for line bearing engagement by each with a pipe wall.

3. In an internal pipe line-up clamp for reception within adjoining ends of longitudinally successive pipe sections, two longitudinally spaced sets of radially expansible circular segments, one for each pipe section, power applying means connected with the segments of one set to control their expansion, other power applying means operable separately from and in sequential relation to the operation of the first mentioned power applying means and connected with the segments of the other set to control their expansion and a succession of circularly spaced pipe bearing rollers pivotally carried by said segments on axes radially fixed relative to the periphery of the circular segments and extended in the longitudinal direction of the pipe sections for pipe section engagement on axially extending lines when the segments are expanded.

4. In a pipe line-up clamp assembly, a series of radially expansible and non-pipe engageable circular segments, a circular succession of pipe engaging rollers and bearings for said rollers fixedly positioned by the segments against radial displacement relative thereto and mounting said rollers for rotation individually, each about an axis longitudinally of the pipe surface to be engaged thereby, said bearings as fixedly positioned by the segments maintaining portions of the rollers radially outwardly spaced from the segments for transmission through the rollers and into the pipe surface engaged thereby of the full force of segment expansion.

5. In an internal pipe line-up clamp, axially spaced apart sets of circular segments, pipe engaging rollers projected peripherally beyond the segments and supported by the segments on axes radially fixed relative to the periphery of the circular segments and parallel to the axis of the segments, expander shackle links extending inwardly from each segment, a pair of axially movable and centrally disposed spiders, one connected to the expander links of one set of segments and the other connected to the expander links of the other set of segments, and selectively operable means to move said spiders either individually or in unison.

6. In an internal clamp assembly for aligning adjacent pipe end portions whose abutting edges are to be welded together, a rigid longitudinal frame assembly, two sets of circularly spaced apart pipe engageable pressure applying rollers, two longitudinally spaced apart coaxial groups of radially projectable roller mounting members, shafts rotatably mounting the rollers on said mounting members on axes extending longitudinally of the frame and with the roller treads projecting peripherally outwardly beyond the mounting members to make pipe surface line contacts, bearing guides carried by the frame assembly intermediate its ends and radially slidably locating said mounting members in closely adjacent side by side relation so that the two sets of circularly spaced rollers are positioned for contact with pipe ends respectively and immediately adjacent their abutting edges, a pair of oppositely disposed fluid pressure motors mounted by the frame and each provided with a longitudinally extending motion transmitting element, a set of radially disposed swinging links joining the mounting members of one group with the motion transmitting element of one of said motors and another set of radially disposed swinging links joining the mounting members of the other group with the motion transmitting element of the other of said motors and valve means controlling actuating pressure fluid flow to said motors selectively for the radial projection separately of said two groups of roller mounting members.

References Cited in the file of this patent

UNITED STATES PATENTS

| | | |
|---|---|---|
| 1,844,385 | Goldsmith | Feb. 9, 1932 |
| 1,873,568 | Ford | Aug. 23, 1932 |
| 1,877,974 | Robb | Sept. 20, 1932 |
| 2,293,107 | Brahnam | Aug. 18, 1942 |
| 2,395,450 | Browning | Feb. 26, 1946 |
| 2,429,053 | Forbes | Oct. 14, 1947 |
| 2,430,273 | Browning | Nov. 4, 1947 |
| 2,615,413 | Adams et al. | Oct. 28, 1952 |
| 2,675,132 | Susil | Apr. 13, 1954 |
| 2,741,206 | Stevenson | Apr. 10, 1956 |
| 2,804,836 | Tiedemann | Sept. 3, 1957 |
| 2,821,946 | Goekler | Feb. 4, 1958 |
| 2,830,551 | Miller | Apr. 15, 1958 |

FOREIGN PATENTS

| | | |
|---|---|---|
| 160,585 | Great Britain | Jan. 2, 1920 |
| 334,783 | Great Britain | Nov. 21, 1928 |